(12) United States Patent
Brewer et al.

(10) Patent No.: US 7,191,540 B1
(45) Date of Patent: Mar. 20, 2007

(54) WORK PIECE HOLDER FOR SURFACE MEASURING APPARATUS

(75) Inventors: Robert J. Brewer, West Chester, OH (US); James A. Christian, Kettering, OH (US)

(73) Assignee: Mitutoyo Corporation, Kawasaki (JP)

( * ) Notice: Subject to any disclaimer, the term of this patent is extended or adjusted under 35 U.S.C. 154(b) by 18 days.

(21) Appl. No.: 11/263,107

(22) Filed: Oct. 31, 2005

(51) Int. Cl.
    *G01B 5/25* (2006.01)
    *G01B 5/004* (2006.01)
(52) U.S. Cl. .............................. 33/551; 33/568; 33/503
(58) Field of Classification Search ................ 33/551, 33/549, 553, 554, 555, 568, 569, 570, 573, 33/503
See application file for complete search history.

(56) References Cited

U.S. PATENT DOCUMENTS

| | | | | |
|---|---|---|---|---|
| 2,676,414 A * | 4/1954 | Derry | ........................... | 33/534 |
| 4,369,581 A * | 1/1983 | Lenz | ........................... | 33/1 M |
| 4,483,079 A * | 11/1984 | Band et al. | ................... | 33/503 |
| 5,257,460 A * | 11/1993 | McMurtry | ................... | 33/502 |
| 5,396,712 A * | 3/1995 | Herzog | ......................... | 33/503 |
| 6,026,583 A * | 2/2000 | Yoshizumi et al. | ........... | 33/503 |
| 6,671,973 B2 * | 1/2004 | Takemura et al. | ............ | 33/551 |
| 6,817,108 B2 * | 11/2004 | Eaton | ........................... | 33/503 |

* cited by examiner

*Primary Examiner*—Christopher W. Fulton
(74) *Attorney, Agent, or Firm*—Rankin, Hill, Porter & Clark LLP

(57) ABSTRACT

A work piece holder includes a base plate, a slide plate, a rotary indexing device, a support assembly, a spindle, and a pallet receiver. The slide plate is manually slidable over the base plate between a plurality of predetermined positions. The rotary indexing device is affixed to the slide plate, and has the support assembly secured thereto and rotated thereby into a desired angular orientation about a first axis of rotation. The spindle is secured to the support assembly, and defines a second axis of rotation that is generally perpendicular to the first axis of rotation. The spindle is manually rotatable about the second axis of rotation between a plurality of predetermined rotary positions. The pallet receiver, which is secured to the spindle and is rotatable therewith about the first and second axes, is adapted to releasably receive a pallet to which a work piece is mounted.

16 Claims, 8 Drawing Sheets

WORK PIECE HOLDER FOR SURFACE MEASURING APPARATUS

BACKGROUND OF THE INVENTION

1. Field of the Invention

The present invention relates to work piece holders for use in conjunction with a surface measuring apparatus and, more particularly, toward work piece holders that allow a work piece to be moved relative to the surface measuring apparatus so as to reposition the work piece for access by the surface measuring apparatus.

2. Description of Related Art

Surface measuring apparatuses are well known devices that are useful for checking a surface profile of a work piece. Such surface measuring machines include a probe that is mounted to a head which, in turn, is mounted to an upright support. The head is movable vertically (z-axis) along the length of the upright support, and is pivotally or rotatably movable about a horizontal axis (parallel to the y-direction) through an angle (angle α). The probe is movable along the length of the head in an x-direction relatively toward and away from the work piece, and is also rotatable about an axis extending along the length of the probe (angle β). The upright support is movable horizontally in a y-direction, which is perpendicular to the x-direction. Such a surface measuring apparatus is sold by Mitutoyo Corporation as model number SV-3000 CNC.

One limitation with this known surface measuring machine is that the maximum translation of the probe in the x-direction, toward and away from the work piece, is limited, making it difficult to handle large work pieces. Increasing this range of motion by modifying the apparatus is possible, but very expensive, and not necessary in most surface measuring procedures. Another limitation with known machines is that manual re-calibration of the machine is normally necessary for each work piece, which is time consuming and labor intensive, and greatly reduces productivity of the machine.

Work piece holders are used to stably hold and reposition work pieces for a surface measuring operation. Such work piece holders tend to be customized to accommodate the particular work piece that is being measured, or to be specially adapted to move the work piece in a desirable fashion during the surface measuring operation. For example, it is known to use a rotary work piece holder, which is similar to a lathe, for holding a rotating a cam shaft during measuring of the cam shaft lobes and journals.

Other work piece holders permit the work piece to be moved in multiple planes so as to reposition the work piece during the surface measuring operation. For example, U.S. Pat. No. 6,671,973, which is assigned to Mitutoyo Corporation, teaches a work piece holder for a surface measuring machine. The work piece holder, which presumably is for relatively small work pieces, is disposed upon a table of the surface measuring machine. The work piece holder includes a y-axis table that is movable in an x-direction and slidable in a y-direction, a swivel table that is rotated in the x-y plane, and a stage, disposed on the swivel table, that is movable in a z-direction. In this way, the work piece holder disclosed in the '973 patent permits the work piece to be moved in two mutually perpendicular directions, and rotated about an axis extending in a third direction. Unfortunately, despite the improved work piece positioning capabilities afforded by the device taught in the '973 patent, portions of the work piece remain inaccessible due, in part, to limited travel of the probe in the x-direction.

U.S. Pat. No. 6,671,571, the entire disclosure of which is expressly incorporated herein by reference, teaches a method of using machining information, previously used to control machine tools, for subsequent work piece measurement to determine or evaluate a quality of the machining operation. The '571 patent provides a great improvement in work piece measuring as manual re-calibration is no longer required. Rather, with the method taught in the '571 patent, reference datum used during a machining operation can be taken off of a part support and subsequently used, by accessing data used during the machining operation, to permit the computer controlled surface measuring machine to automatically compare measured data with the machining data so as to determine whether the machining of the work piece has been properly performed. Naturally, in order to fully utilize the automated method taught by the '571 patent to its full advantage, access must be provided to each machined surface of the work piece. However, this is difficult or impossible with known work piece holders.

Accordingly, there exists a need in the art for a work piece holder that permits improved access to the held work piece so as to permit improved automatic or semi-automatic surface measuring. There further exists a need in the art for a work piece holder that is useful in conjunction with a surface measuring machine to automatically or semi-automatically permit measuring of the surface of a held work piece.

SUMMARY OF THE INVENTION

The present invention is directed toward a work piece holder that permits improved access to the held work piece so as to permit improved automatic or semi-automatic surface measuring. There present invention is further directed toward a work piece holder that is useful in conjunction with a surface measuring machine to automatically or semi-automatically permit measuring of the surface of a held work piece.

In accordance with the present invention, the work piece holder is mounted to a surface measuring apparatus and used to hold and accurately reposition a work piece. The work piece holder includes a series of sensors that monitor the position and orientation of the work piece holder, and the work piece thereon, and communicate such position and orientation information to the surface measuring machine. The surface measuring machine uses the communicated position and orientation information to determine which surface(s) of the held work piece are accessible for measurement and to automatically perform a surface measuring operation.

In further accordance with the present invention, the work piece holder permits the work piece to be moved laterally (x-direction), to be rotated about a vertical axis (z-direction), and to be tilted about a horizontal axis (y-direction) so as to permit the surface measuring apparatus to access substantially the entire work piece. The work piece holder of the present invention includes a base plate, a slide plate, a rotary indexing device, a support assembly, a spindle, and a pallet receiver. The base plate is secured to a table of the surface measuring apparatus, while the slide plate is secured to the base plate and manually slidable thereon between a plurality of predetermined positions. Preferably, the base plate and slide plate cooperating to provide an air bearing to assist in manual sliding of the slide plate relative to the base plate. The rotary indexing device is secured to the slide plate and is slidable therewith between the plurality of predetermined positions. The support assembly is secured to the rotary indexing device and is rotated thereby into a desired angular orientation about a first axis of rotation. The spindle, which is secured to the support assembly and is rotated therewith into the desired angular orientation by operation of the rotary indexing device, defines a second axis of rotation that is generally perpendicular to the first axis of rotation. The spindle is manually rotatable about the second axis of rotation between a plurality of predetermined rotary positions. The pallet receiver is secured to the spindle and is rotatable therewith about the first and second axes of rotation.

In further accordance with the present invention, the pallet receiver holds a pallet and a work piece affixed to the pallet. The pallet preferably includes datum points that serve as a reference for subsequent surface measuring operations. A controller is provided that monitors signals from sensors disposed on the work piece holder to determine a position and orientation of the work piece, and to control operation of the surface measuring apparatus such that a desired surface feature may be rapidly accessed and measured. In accordance with the present invention, should measurement of a surface feature be desired when the work piece is in a position and/or orientation that does not provide access to the desired surface feature, the operator will be instructed to manually reposition or re-orient the work piece, via manual manipulation of the slide plate and/or spindle, so as to permit such surface measuring to take place.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1A:
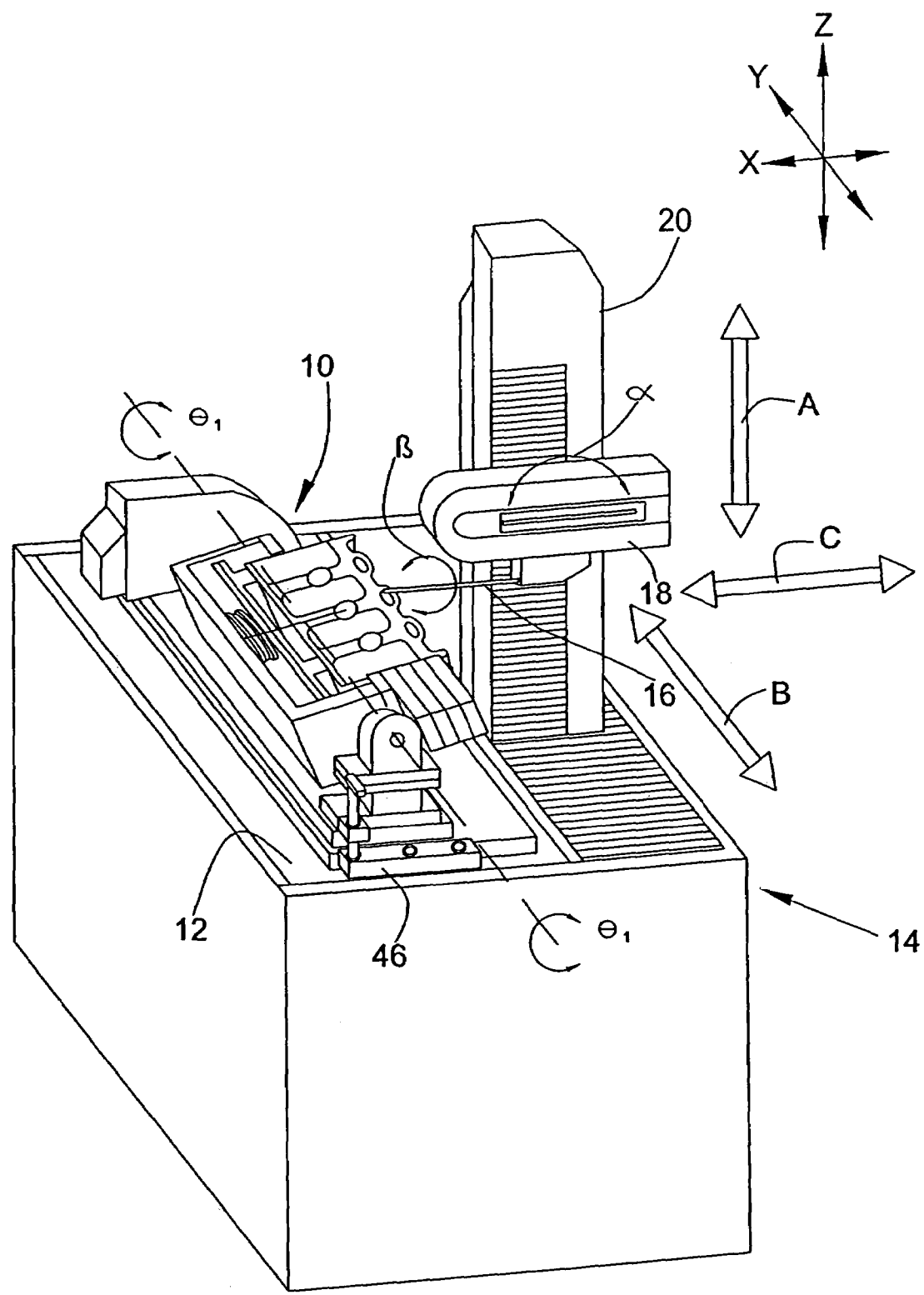
FIG. 1A is a schematic perspective view of a surface measuring apparatus including a work piece holder according to the present invention, and showing the work piece held in an angled or tilted orientation.

The present invention is directed toward a work piece holding assembly 10 that is disposed upon a table 12 of a surface measuring apparatus 14. The surface measuring apparatus 14 includes a probe 16 that is mounted to a head 18 which, in turn, is mounted to an upright support 20. The upright support 20 is spaced from the table 12, as illustrated. The head 18 is movable vertically in a z-direction, indicated by arrow A, along the length of the upright support 20, and is pivotally or rotatably movable about a horizontal axis extending in a y-direction, indicated by arrow B, through an angle (angle $\alpha$). The probe 16 is movable along the length of the head along an x-direction, indicated by arrow C, relatively toward and away from the work piece, and is also rotatable about an axis extending along the length of the probe 16 (angle $\beta$). The upright support 20 is movable horizontally in the y-direction (i.e., in the direction of arrow B), which is perpendicular to the x-direction (i.e., arrow C). The surface measuring apparatus 14 described to this point is well known in the art, and generally identical to that previously described in the present application. As noted previously, the surface measuring apparatus probe 16 has a limited range of motion in the x-direction which heretofore has limited its ability to access and measure surface features of large work pieces.

The work piece holding assembly 10 of the present invention is adapted to receive a fixture or pallet 22 upon which a work piece 24 is disposed. The assembly 10 includes a base plate 26 that is fixed to the table 12, a slide plate 28 that is slidable in the x-direction (i.e., toward and away from the upright support 20) over the base plate 26 between a plurality of predetermined positions, first and second arms 30, 31 extending upwardly from opposite ends of the slide plate 28, a generally U-shaped support assembly 32 extending between the arms 30, 31, a spindle 34 rotatably secured to a lower support member of the support assembly 32, and a pallet receiver 36 fixed to the spindle 34. The pallet receiver 36 includes clamp assemblies 38 to secure the work piece pallet 22 in place thereon.

Figure 2A:
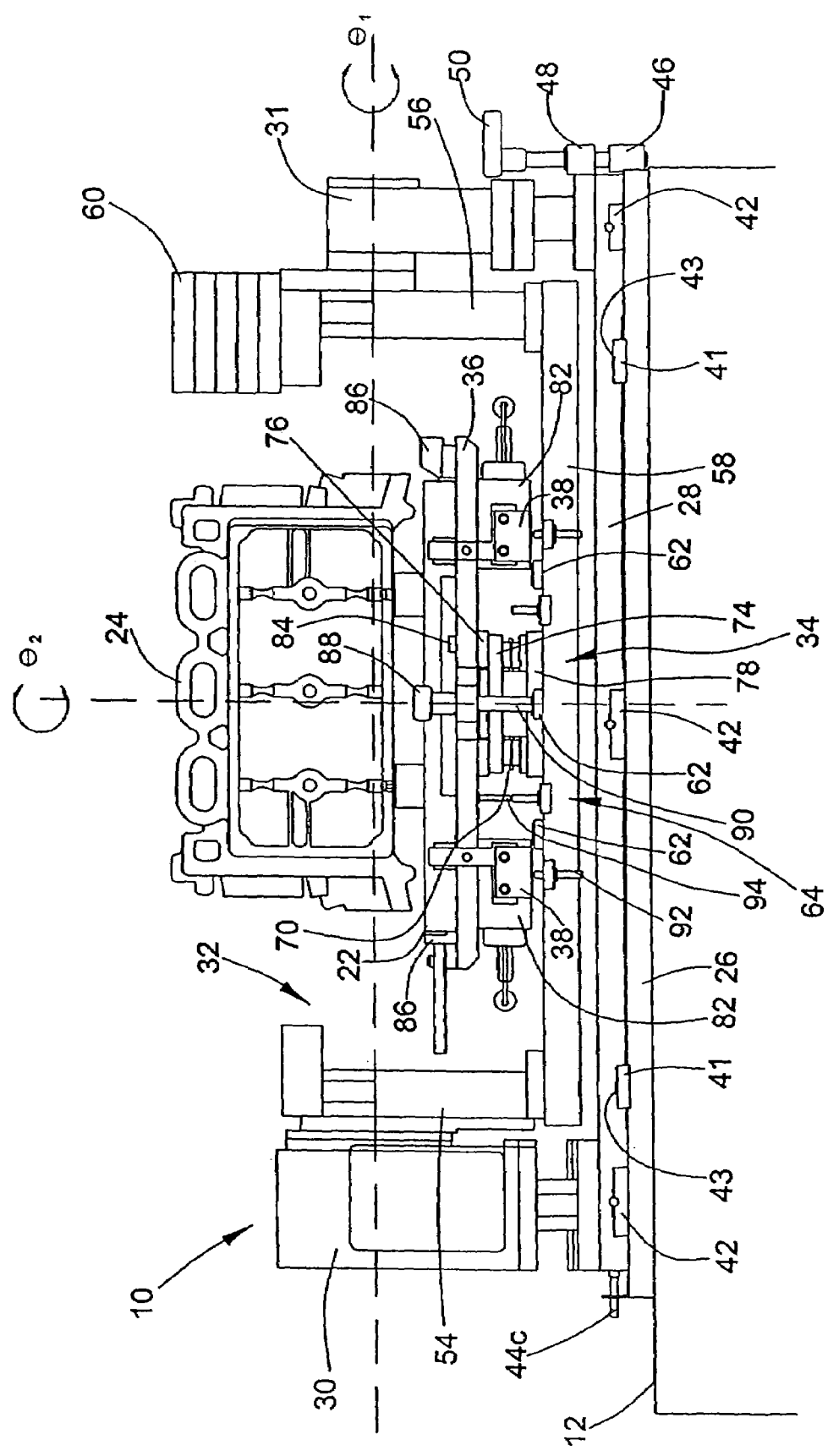
FIG. 2A is a front elevational view of the work piece holder and work piece, with the work piece in a normal orientation.
Figure 2B:
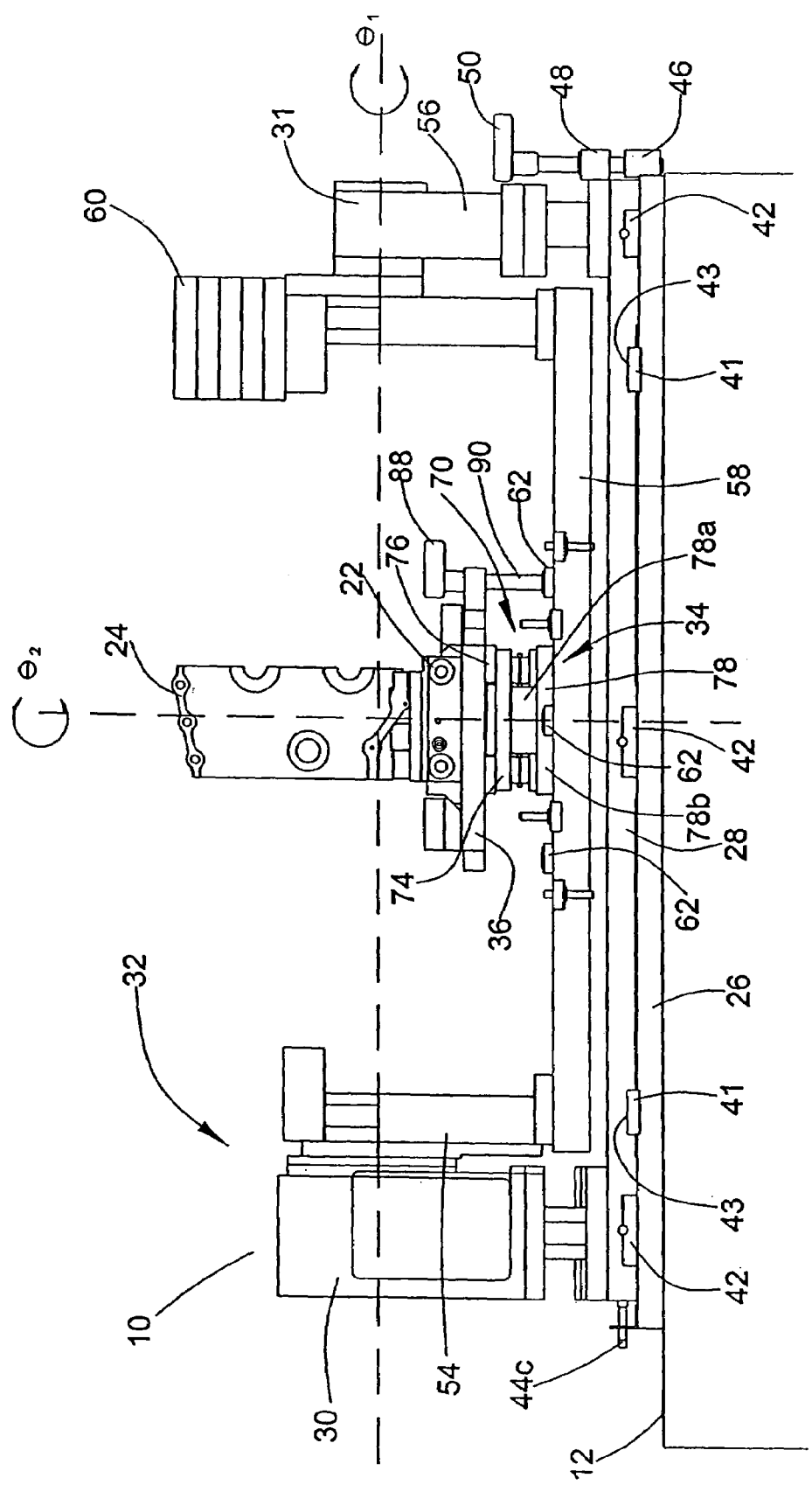
FIG. 2B is similar to FIG. 2A, but shows the work piece held in the upright and rotated orientation of FIG. 1B.
Figure 3A:
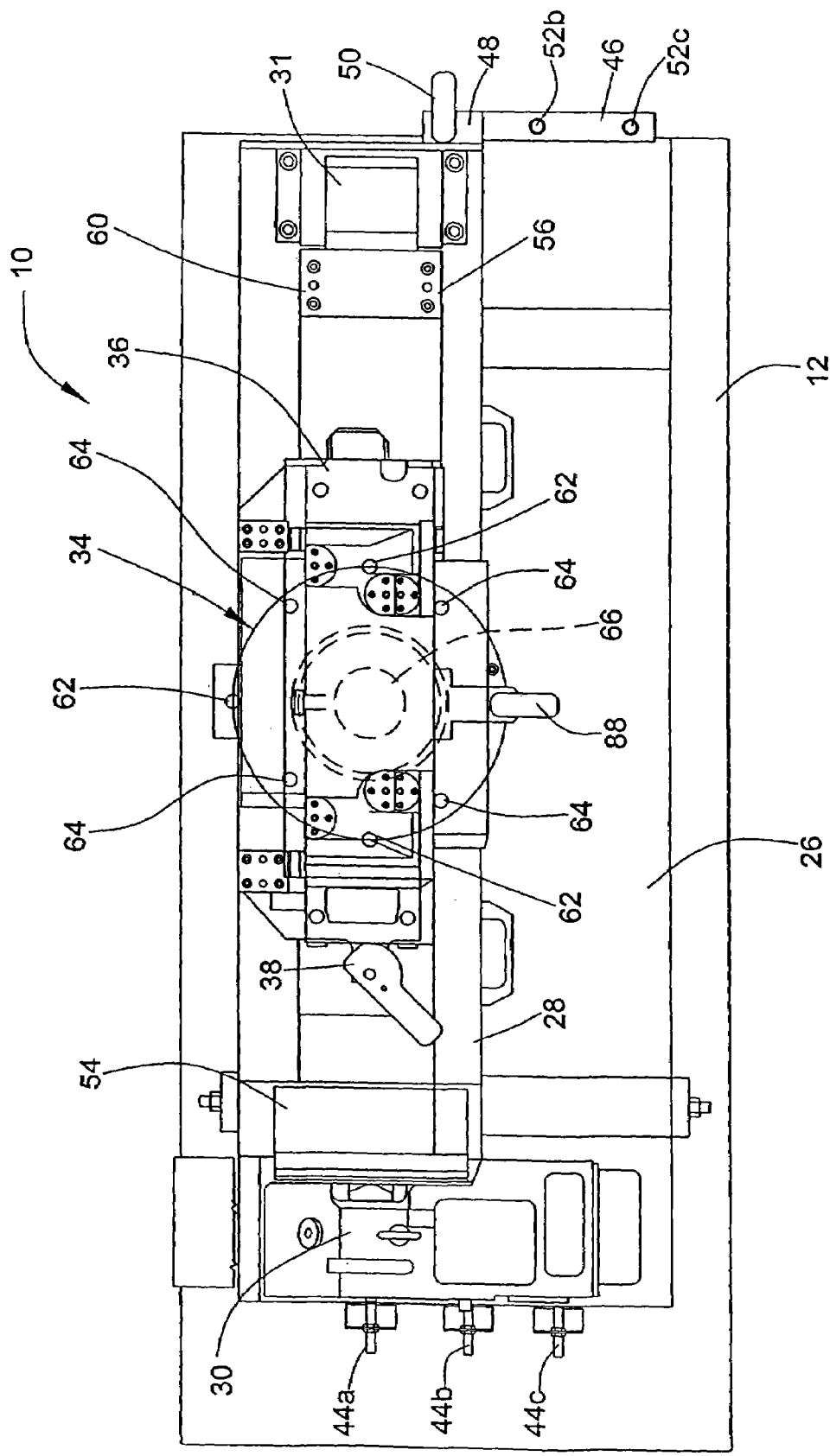
FIG. 3A is a top plan view with the work piece removed for purposes of clarity, and with the work piece holder disposed in a first position relatively close to the surface measuring apparatus.
Figure 3B:
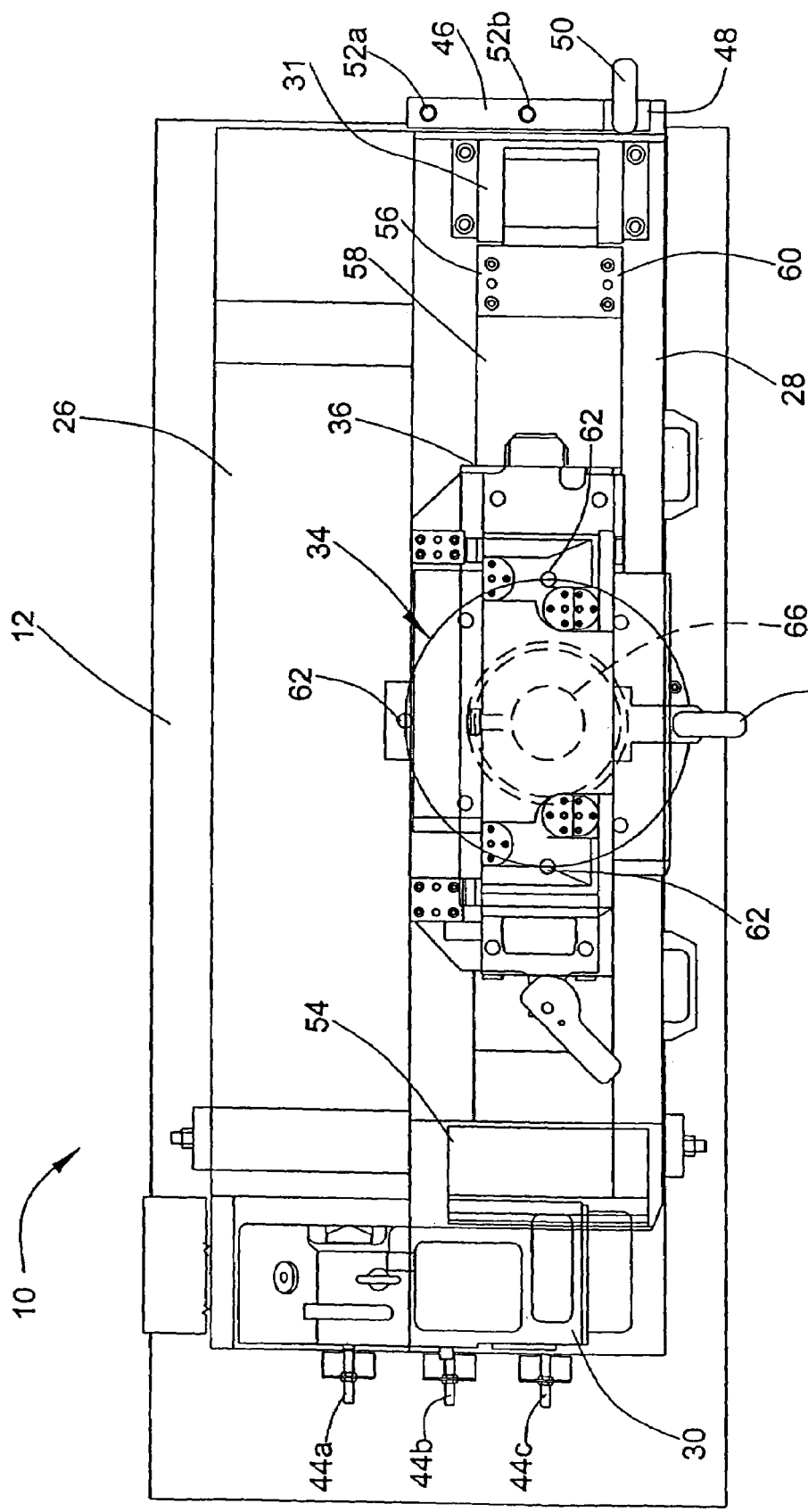
FIG. 3B is a view similar to that of FIG. 3A, but with the work piece holder in a second position relative far from the surface measuring apparatus.

With reference to FIGS. 2A–2B, an air bearing is provided between the base plate 26 and the slide plate 28, preferably by supplying pressurized air to a series of channels 42 formed in a lower surface of the slide plate 28. The air bearing assists in supporting the weight of the slide plate 28 and the work piece 24 so as to ease manual sliding of the slide plate 28 in the x-direction. Guide assemblies are also preferably provided to assist in guiding the slide plate 28 in the x-direction, such as the illustrating cooperating key 41 and groove 43 structures.

One lateral end of the base plate 26 has a series of slide plate sensors 44a, 44b, 44c, preferably proximity sensors, mounted thereto while the opposite lateral end of the base plate 26 includes a lock plate 46 extending therefrom. The slide plate sensors 44a, 44b, 44c are operable to sense a position of the slide plate 28 as the slide plate 28 is moved between any one of a plurality of predetermined positions relative to the base plate 26. Preferably, when the slide plate 28 is in one of the predetermined positions, the corresponding sensor 44a, 44b, 44c is engaged by a projection extending from the slide plate 28 to thereby sense the slide plate position, although many equivalent sensor mounting arrangements are contemplated. Signals from the slide plate sensors 44a, 44b, 44c are communicated to a controller that monitors the position of the work piece 24 so as to determine the position and orientation of the work piece surfaces. In the preferred embodiment, three predetermined slide plate positions, at 100 mm intervals, are illustrated, although it is contemplated that more or less than three positions at relatively different spacings may be provided.

The lock plate 46 cooperates with a lock assembly 48, which includes a lock pin 50, provided on the slide plate 28 to releasably secure the slide plate 28 to the base plate 26 in any of the three predetermined positions. More specifically, the lock plate 46 includes three apertures 52a, 52b, 52c, each corresponding to one of the predetermined positions and spaced at 100 mm intervals. When the slide plate 28 is moved into a desired one of the predetermined positions, the lock pin 50 is manually inserted into the corresponding aperture 52a, 52b, 52c in the lock plate 46 to secure the slide plate 28 to the base plate 26 in the x-direction. Simultaneously, the associated slide plate sensor 44a, 44b, 44c senses the slide plate position, which is communicated to the controller.

As noted previously, the slide plate 28 includes first and second arms 30, 31 that extend upwardly from opposite ends of the slide plate 28. The first and second arms 30, 31 support the support assembly 32 for rotation therebetween. More specifically, the first and second arms 30, 31 serve as a rotary indexing device, wherein the first arm 30 is a powered and computer controlled rotary index table and the second arm is a tail stock, such as a side table (air powered) or side spindle (passive). Accordingly, the rotary indexing device is selectively controlled or activated to move the support assembly 32, and the work piece 24 disposed thereon, into a desired tilted or rotary position, as will be apparent from the following discussion. Such rotary indexing devices are known in the art and are sold by many companies, such as Yukiwa Seiko U.S.A. Inc., of Charlotte, N.C., and will therefore not be discussed at length hereinafter.

The support assembly 32 extends between the first and second arms 30, 31, and is controllably rotated by the rotary indexing device provided thereby so as to rotate about an axis ($\theta_1$) extending in the y-direction. The angular position of the indexing device and, therefore, the support assembly 32, is controlled and monitored by the controller so as to ascertain the position and orientation of the work piece 24 disposed thereon, as is necessary for surface measuring operations. Rotation of the support assembly 32 by the rotary indexing device is automatically controlled such that, when a particular surface feature is to be measured, the controller determines the angular orientation to place the particular surface feature in a position for access by the probe, and then, assuming that the slide plate 28 and spindle 34 are sensed to be in a condition to permit rotation of the support assembly 32, automatically activates the indexing device to rotate the support assembly 32, and the work piece 24 disposed thereon, into the proper angular orientation.

The support assembly 32 includes first and second upright support arms 54, 56 and a lower support member 58. The lower support member 58 extends between and interconnects the lower ends of the first and second upright support arms 54, 56 such that the support assembly 32 has a generally U-shaped configuration. The first upright support arm 54 is secured to mounts at the first arm 30 (i.e., the powered rotary indexing table) while the second upright support arm 56 is secured to mounts at the second arm 31 (i.e., the tail stock). Accordingly, the support assembly 32 is rotatable via operation of the rotary indexing device around a horizontal axis ($\theta_1$ axis, extending in the y-direction) defined by the arm mounts so as to provide access to top, bottom, front and rear surfaces of the work piece 24.

In the illustrated and preferred embodiment, the second upright support arm 56 has a counterweight 60 secured to an upper end thereof. The counterweight 60 assists in balancing a weight of the support assembly 32 and the pallet 22 during and after rotation by the rotary indexing device, and assists in balancing loads placed upon the rotary indexing table 31. Preferably, the counterweight 60 is sized based upon the weight of the support assembly 32 and the pallet 22, and therefore is relatively customized to offset loads actually experienced by the rotary indexing table 31.

The lower support member 58 has the spindle 34 secured thereto, a series of rotary lock apertures 62 formed therethrough at regular intervals (i.e., 90° intervals) around the spindle 34, as well as a series of rotary position sensors 64. The rotary position sensors 64 sense the rotary position of the spindle 34 and, thus, the work piece 24, as described hereinafter.

The spindle 34 includes a center shaft 66, a thrust bearing assembly 70, an annular spacer 74, and upper and lower mounting plates 76, 78. The center shaft 66, which has a lower radially extending flange 80 affixed to a bottom surface of the lower support member 58, extends through the lower support member 58 and into a blind bore in the pallet receiver 36. Thus, the center shaft 66 serves to securely connect the pallet receiver 36 to the lower support member 58 while permitting rotation of the pallet receiver 36 relative to the lower support member 58.

The lower mounting plate 78 includes a raised center portion 78a having a central bore through which the center shaft 66 extends, and a radially extending flange 78b that rests upon the lower support member 58. The radially extending flange 78b is affixed, preferably by bolts, to the lower support member 58 and an optional backing plate provided on the bottom side of the lower support member 58. The lower mounting plate 78 serves as a bearing post that the thrust bearing assembly 70 rests upon and radially surrounds. The annular spacer 74 is disposed on top of the thrust bearing assembly, and has a raised center portion defining an opening through which the center shaft 66 extends. The upper mounting plate 76 is ring-shaped and radially surrounds the raised center portion of the spacer 74. Preferably, the upper mounting plate 76 is affixed to the annular spacer 74 by a plurality of mechanical fasteners, and is affixed to the pallet receiver 36 by a further plurality of mechanical fasteners.

Accordingly, by the spindle 34, the pallet receiver 36 is mounted to the lower support member 58 for rotation about a vertical axis ($\theta_2$ axis). Inclusion of the thrust bearing assembly 70 insures that the spindle 34 can support the weight of the pallet 22 and work piece 24, while maintaining a constant vertical position and axis of rotation, as is necessary for precision in the surface measuring operation to be performed. Although the spindle 34 has been described with particularity herein, it is considered apparent that other spindle assemblies, either currently known or later developed, may be used with equal functionality and, therefore, the present invention is not limited to the particular spindle described herein.

The pallet receiver 36 includes a plate-like body from which downwardly extends a pair of clamp mounts 82 and from which one or more guide rail(s) 84 upwardly extend. The guide rail(s) 84 extend in the x-direction and are received in downwardly facing grooves formed in the pallet 22 so as to permit the pallet to slide in the x-direction during clamping of the pallet 22 to the pallet receiver 36. The plate-like body defines the downwardly facing blind bore that the center shaft 66 of the spindle 36 extends into, and has a series of openings formed therein through which the clamp assemblies 38 extend.

The clamp assemblies 38 preferably include cam blocks 86 that are disposed on top of the plate like body and laterally surround and engage the pallet 22. The clamp members include manually movable handles that actuate connecting rods to slidably urge the pallet 22 in the x-direct and into engagement with the cam blocks 86 to quickly and securely, yet releasably, attach the pallet 22 to the pallet receiver 36. Pallet sensors 92 are associated with the clamp assemblies 38, and are operable to detect when the clamps assemblies 38 are engaged, which is indicative of the pallet 22 being properly secured to the pallet receiver 36. Signals from the pallet sensors 92 are communicated to the controller. Naturally, operation of the control system to rotate the support assembly 32 and work piece 24 to perform surface measuring operations is precluded when the pallet sensors 92 are not actuated.

The pallet receiver 36 also includes a lock assembly 88 including a lock pin 90 that cooperates with the rotary lock apertures 62 in the lower support member 58 to secure the pallet receiver 36 and the work piece 24 in any one of a predetermined number (i.e., four) of rotary positions. As noted previously, the rotary lock apertures 62 are spaced equiangularly around the spindle 34 (i.e., at 90° intervals). Accordingly, the pallet receiver and work piece 24 can be manually repositioned into the desired predetermined rotary position by removing the lock pin 90 from one of the rotary lock apertures 62, manually turning the spindle 34, and reinserting the lock pin 90 into another rotary lock aperture 62. It will be appreciated that the spindle 34 permits the work piece 24 disposed thereon to be manually rotated about a vertical axis ($\theta_2$ axis) without rotating the support assembly 32 and the slide plate 28, and thereby provides access to the end surfaces of the work piece.

A rotary position of the pallet receiver 36 is sensed by a series of rotary position sensors 64 that are selectively engaged by a projection 94 extending downwardly from the pallet receiver 36. Preferably, each of the rotary position sensors 64 is associated with one of the predetermined rotary positions and is disposed adjacent the associated rotary lock aperture 62. Actuation of one of the rotary position sensors 64 by engagement with the projection 94 is communicated to the controller, and used to determine the rotary orientation of the work piece 24. Preferably, the controller will not permit a surface measuring operation unless a rotary position signal is received from one of the rotary position sensors 64.

The pallet 22 is securely attached to the work piece 24 by cooperation of a series of pins and mechanical fasteners, which are not illustrated in detail. Preferably, the pallet 22 is affixed to the work piece 24 prior to a work piece machining operation. Following the machining operation, the pallet 22 and work piece 24 are transported to the surface measuring apparatus 14 and secured to the pallet receiver 36 by operation of the clamping assemblies 38, described hereinbefore. Insofar as numerous pallets are known in the art, and that such pallets are usually customized to fit the part or work piece received thereon, it is considered apparent that that present invention is not limited to the pallet specifically illustrated and described herein.

Preferably, the pallet 22 includes one or more datum points. Such datum points are calibrated to the work piece 24, and serve as references during the machining operation such that the surfaces of the work piece 24 are properly machined. In accordance with the present invention, the datum points on the pallet 22 are automatically located by the probe 16 at the start of a surface measuring operation, and thereby permit rapid and accurate calibration of the surface measuring apparatus 14, which greatly facilitates checking of particular surface features.

The controller monitors the signals from the pallet sensors 92 to insure that the work piece 24 is properly secured to the holding assembly 10, and monitors signals from the slide plate sensors 44a, 44b, 44c and the rotary position sensors 64, to determine the position of the work piece in the x-direction and rotary position of the work piece relative to the $\theta_2$ axis. Further, the controller monitors and controls the rotary indexing device so as to determine the angular orientation of the work piece relative to the $\theta_1$ axis. The controller uses this information, together with preloaded data related to the work piece surfaces (preferably derived from the machining data used to machine the work piece surface) to determine which surfaces and surface features are accessible for the probe 16, and to control the surface measuring apparatus 14.

Preferably, the controller includes a user interface, such as a touch screen, that permits the operator to easily select surface features that are to be measured. It is contemplated that for any particular work piece, there are critical or desired surface features that need to be checked periodically, and that these surface features may be identified in a menu-driven graphical user interface to permit the operator to quickly select such desired features for a surface measuring operation. It is further noted that while surface measuring of such features may be desired, it may not be possible for the probe 16 to access such desired surface features, depending upon the location and orientation of the work piece. Accordingly, it is further contemplated that the accessibility of the work piece surface features listed in the menu on the user interface be desirably color coded to indicate whether such surface features are accessible and, if not accessible, provide the operator with an indication of manual re-positioning necessary to obtain access to such features.

As will be appreciated from the foregoing discussion, the present invention provides a semi-automatic or semi-manual work piece holder, whereby some operator intervention may be necessary to place the work piece in a location or orientation to permit automatic surface measuring of a desired surface feature. For example, repositioning of the slide plate 28 and rotation of the spindle 34 are manual operations. In the present invention, if the slide plate 28 and/or spindle 34 is in a position that permits the probe 16 to access the desired surface feature, no operator intervention is required. However, if the slide plate 28 or spindle 34 is positioned such that access to the desired surface feature is not available, the operator will be instructed by the user interface to reposition the slide plate 28 and/or spindle 34. Once the slide plate 28 and/or spindle 34 is properly re-positioned, the surface measuring procedure on the desired surface feature can be performed automatically by the surface measuring apparatus 14.

Figure 1B:
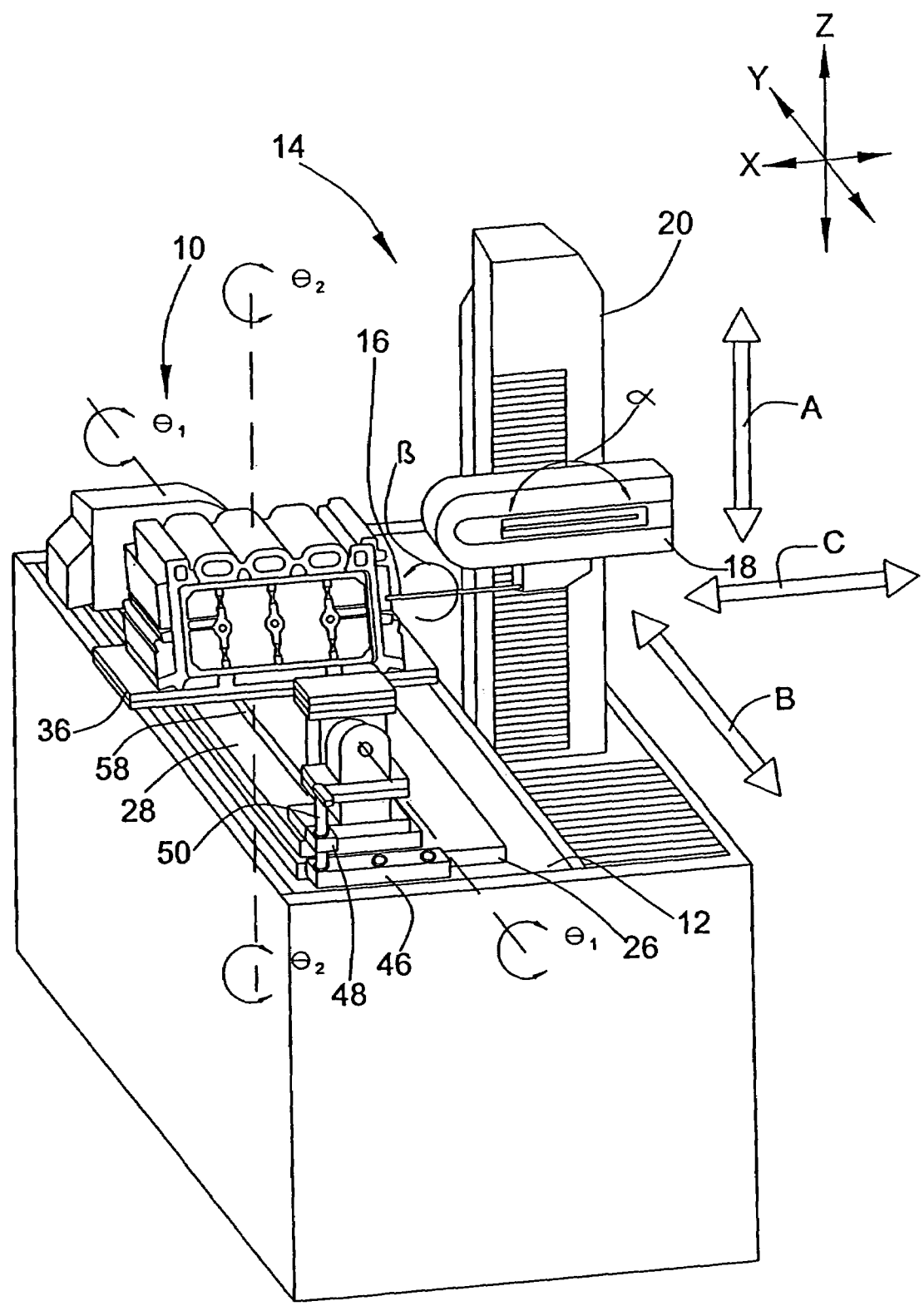
FIG. 1B is schematic view similar to FIG. 1A, but shows the work piece in an upright and rotated orientation.

More specifically, an end surface of the work piece 24 may only be accessible when the spindle 34 is rotated 90° (or 270°) such that the end surface of the work piece is facing toward the surface measuring machine upright support 20 (FIG. 1B). Accordingly, if it is desired to measure a surface feature on the end surface of the work piece 24 while the work piece is in a different rotary position (i.e., 0° or 180° position), the user interface will desirably indicate to the operator what rotary position is necessary to obtain access to the desired surface feature. Once the spindle 34 is rotated to the required rotary position, as sensed by the rotary position sensors 64, surface measuring of the selected surface feature can be automatically performed by the surface measuring apparatus 14.

It is also noted that the probe 16 has a limited range of travel in the x-direction (perhaps only 200 mm). Regardless of the rotary position of the spindle 34, some work piece surface features may be inaccessible when the slide plate 28 is in rearward-most position (i.e., with lock pin 50 received in lock aperture 52c). If this is the case, the user interface will indicate to the operator that the slide plate 28 needs to be slid relatively closer to the upright support 20.

Figure 4A:
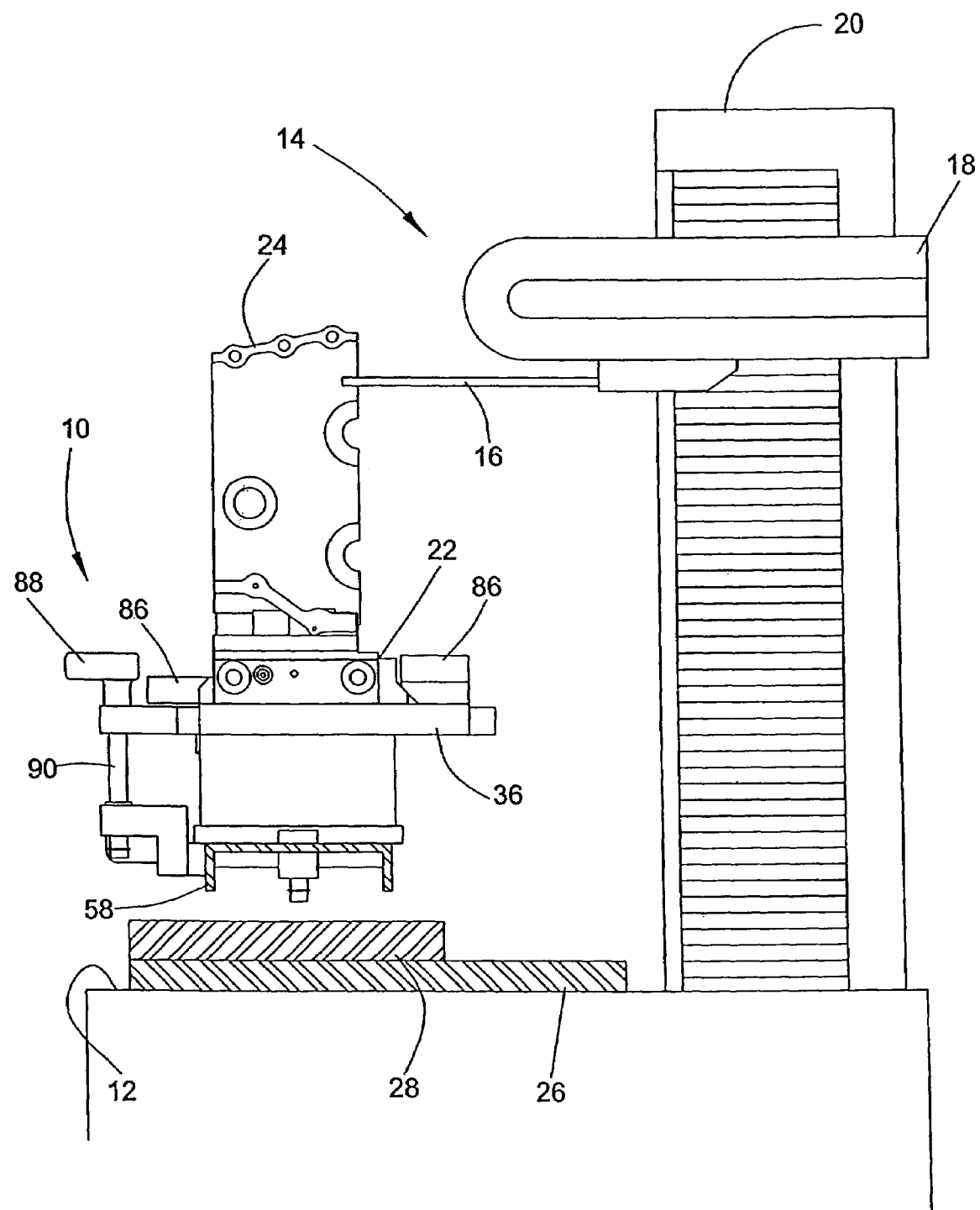
FIG. 4A is an end elevational view, partly in cross section, and showing the work piece holder and work piece in a normal orientation and position, similar to that of FIG. 2A.
Figure 4B:
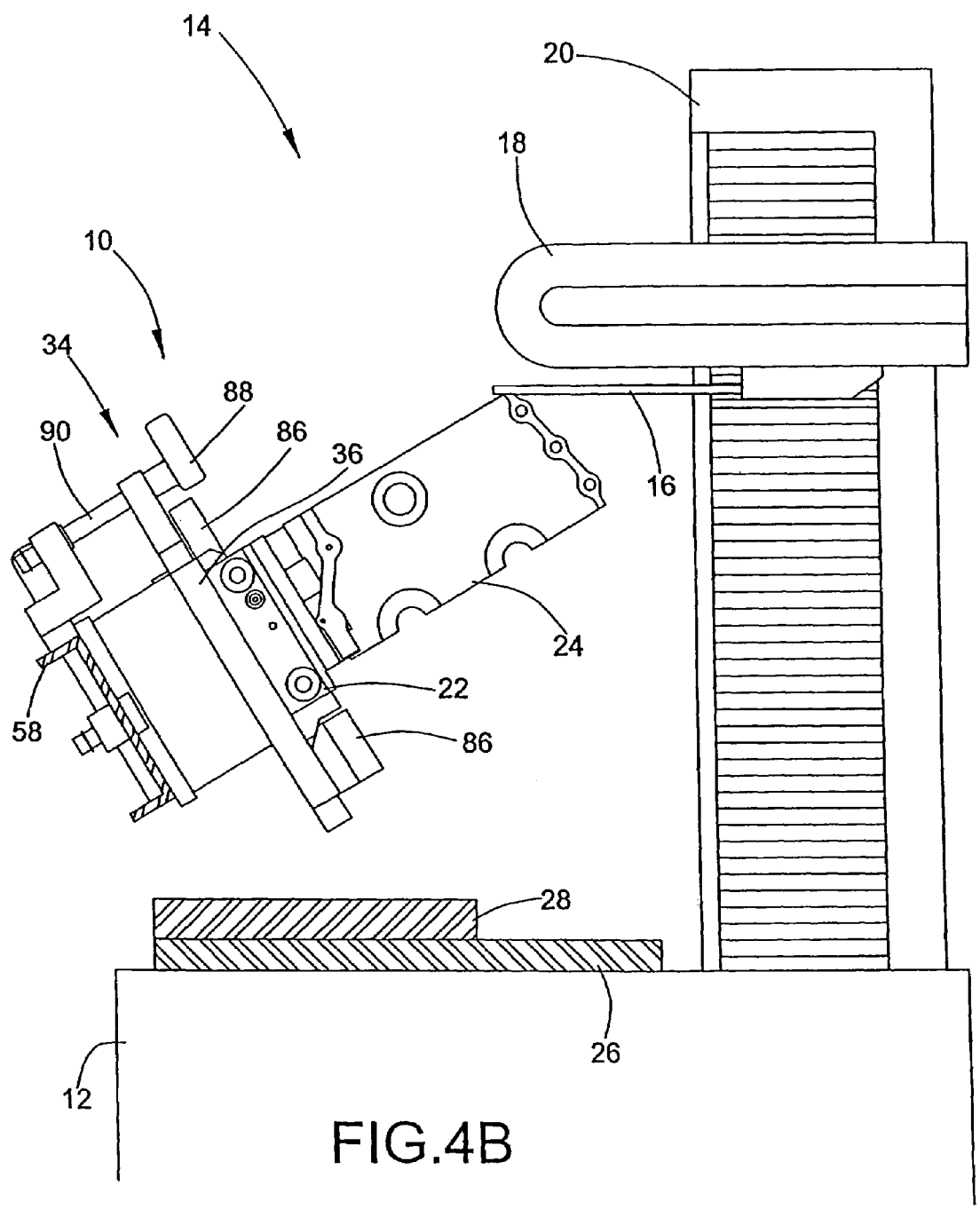
FIG. 4B is a view similar to that of FIG. 4A, but showing the work piece holder in the angled or tilted orientation of FIG. 1A.

It is noted that rotary tilting of the work piece 24 to gain access to, for example, the top surface of the work piece 24 is performed automatically by computer controlled actuation of the rotary indexing device. However, in the present invention it is desirable to limit rotation about the $\theta_1$ axis to cases in which the spindle 34 is in a normal position (non-rotated or 0° position, as shown in FIGS. 1A, 2A, and FIG. 4B) and the slide plate 28 is in a middle or rearward-most position (i.e., lock pin 50 is received in either lock aperture 52b or 52c). Accordingly, if measurement of a surface feature requiring rotary tilting of the work piece 24 is desired, and the spindle 34 is rotated from the normal position or the slide plate 28 is in the forward-most position, the user interface will indicate the manual repositioning procedures necessary to permit such automatic tilting of the work piece to take place.

While the preferred embodiment of present invention has been described herein with particularly, it is noted that the invention is capable of numerous modifications, rearrangements, and substitutions of parts without departing from the scope and spirit of the present invention. Accordingly, the invention is not limited to the particular structures described herein, but rather is only to be defined by the claims appended hereto.

What is claimed is:

1. A work piece holder for use on a surface measuring apparatus, comprising:
    a base plate secured to a table of the surface measuring apparatus;
    a slide plate secured to the base plate and manually slidable thereon between a plurality of predetermined positions, said base plate and slide plate cooperating to provide an air bearing to assist in manual sliding of the slide plate relative to the base plate;
    a rotary indexing device secured to the slide plate and slidable therewith between the plurality of predetermined positions;
    a support assembly secured to the rotary indexing device and being rotated thereby into a desired angular orientation about a first axis of rotation;
    a spindle secured to said support assembly and being rotated thereby into the desired angular orientation, said spindle defining a second axis of rotation that is generally perpendicular to said first axis of rotation and being manually rotatable about said second axis of rotation between a plurality of predetermined rotary positions;
    a pallet receiver secured to said spindle and being rotatable therewith about said first and second axes of rotation, said pallet receiver being adapted to releasably receive a pallet to which a work piece is mounted.

2. The work piece holder according to claim 1, wherein said support assembly includes a counterweight that assists in balancing a weight of the support assembly and the pallet.

3. The work piece holder according to claim 1, further comprising a lock for releasably holding said slide plate in any one of said plurality of predetermined positions.

4. The work piece holder according to claim 1, further comprising a lock for releasably holding said spindle in any one of said plurality of predetermined rotary positions.

5. The work piece holder according to claim 1, wherein, when said work piece holder is in a normal orientation, the slide plate is slidably movable in an x-direction, toward and away from the surface measuring apparatus, said first axis about which said support assembly is rotatable extends in a y-direction, generally perpendicular to the x-direction, and the second axis about which the spindle rotates extends in a z-direction, generally perpendicular to both said x-direction and said y-direction.

6. The work piece holder according to claim 1, further comprising a slide plate sensor that is operable to determine a position of said slide plate.

7. The work piece holder according to claim 1, further comprising a rotary position sensor that is operable to determine a rotary position of said spindle.

8. The work piece holder according to claim 1, further comprising a pallet sensor that is operable to determine whether the pallet is secured to the pallet receiver.

9. A surface measuring apparatus, comprising:
    a table to which a work piece holder is secured;
    an upright support that is disposed in spaced relation to the table and movable in a y-direction;
    a head that is mounted to the upright support and movable in a z-direction along a length of the upright support;
    a probe extending from the head and movable in an x-direction;
    wherein the work piece holder comprises:
        a base plate secured to the table of the surface measuring apparatus;
        a slide plate secured to the base plate and manually slidable thereon in the x-direction between a plurality of predetermined positions, said base plate and slide plate cooperating to provide an air bearing to assist in manual sliding of the slide plate relative to the base plate;
        a rotary indexing device secured to the slide plate and slidable therewith between the plurality of predetermined positions;
        a support assembly secured to the rotary indexing device and being rotated thereby into a desired angular orientation about a first axis of rotation that extends in the y-direction;
        a spindle secured to said support assembly and being rotated thereby into the desired angular orientation, said spindle defining a second axis of rotation extending in the z-direction, said second axis of rotation being generally perpendicular to said first axis of rotation, said spindle manually rotatable about said second axis of rotation between a plurality of predetermined rotary positions;
        a pallet receiver secured to said spindle and being rotatable therewith about said first and second axes of rotation, said pallet receiver being adapted to releasably receive a pallet to which a work piece is mounted.

10. The surface measuring apparatus according to claim 9, wherein said support assembly includes a counterweight that assists in balancing a weight of the support assembly and the pallet.

11. The surface measuring apparatus according to claim 9, further comprising a lock for releasably holding said slide plate in any one of said plurality of predetermined positions.

12. The surface measuring apparatus according to claim 9, further comprising a lock for releasably holding said spindle in any one of said plurality of predetermined rotary positions.

13. The surface measuring apparatus according to claim 9, further comprising a slide plate sensor that is operable to determine a position of said slide plate.

14. The surface measuring apparatus according to claim 13, further comprising a rotary position sensor that is operable to determine a rotary position of said spindle.

15. The surface measuring apparatus according to claim 14, further comprising a pallet sensor that is operable to determine whether the pallet is secured to the pallet receiver.

16. The surface measuring apparatus according to claim 15, further comprising a controller that receives signals from said sensors and monitors a position and orientation of said work piece, wherein said controller including a user interface that permits a user to request measurement of a particular surface feature of said work piece and, when said controller determines that said particular surface feature is not accessible to the probe in a current position and/or orientation of the work piece, the controller instructs the operator to move said work piece into a position and/or orientation that said particular surface feature will be accessible to the probe by moving at least one of the slide plate and the spindle into a different predetermined position.

* * * * *